United States Patent [19]
Brown et al.

[11] Patent Number: 5,267,345
[45] Date of Patent: Nov. 30, 1993

[54] SPEECH RECOGNITION APPARATUS WHICH PREDICTS WORD CLASSES FROM CONTEXT AND WORDS FROM WORD CLASSES

[75] Inventors: Peter F. Brown, New York; Stephen A. Della Pietra, Pearl River; Vincent J. Della Pietra, Blauvelt; Robert L. Mercer, Yorktown Heights, all of N.Y.; Philip S. Resnik, Philadelphia, Pa.; Stanley S. Chen, Cambridge, Mass.

[73] Assignee: International Business Machines Corporation, Armonk, N.Y.

[21] Appl. No.: 834,063

[22] Filed: Feb. 10, 1992

[51] Int. Cl.$^5$ .............................................. G10L 9/00
[52] U.S. Cl. ................................................ 395/2.64
[58] Field of Search ................................ 381/41–46; 395/2.64

[56] References Cited

U.S. PATENT DOCUMENTS

| | | | |
|---|---|---|---|
| 4,748,670 | 5/1988 | Bahl et al. | 381/43 |
| 4,831,550 | 5/1989 | Katz | 381/43 |
| 4,980,918 | 9/1990 | Bahl et al. | 381/43 |

FOREIGN PATENT DOCUMENTS

| | | |
|---|---|---|
| 0242743 | 10/1987 | European Pat. Off. |
| 0299572 | 1/1989 | European Pat. Off. |
| 0418711 | 3/1991 | European Pat. Off. |

OTHER PUBLICATIONS

Bahl, L. R., et al. "A Maximum Likeihood Approach to Continuous Speech Recognition," IEEE Transactions on Pattern Analysis and Machine Intelligence, volume PAMI-5, No. 2, pp. 179-180, Mar. 1983.
Bahl, L. R., et al. "A Tree-Based Statistical Language Model for Natural Language Speech Recognition." IEEE Transactions on Acoustics, Speech, and Signal Processing, vol. 37, No. 7, Jul. 1989, pp. 1001-1008.
Bahl, L. R., et al. "Vector Quantization Procedure For Speech Recognition Systems Using Discrete Parameter Phoneme-Based Markov Word Models." IBM Technical Disclosure Bulletin, vol. 34, No. 7, Dec. 1989, pp. 340 and 341.
Brown, P. F., et al. "A Statistical Approach to Machine Translation." Computational Lignuistics, vol. 16, No. 2, Jun. 1990, pp. 79-85.
Mays, E., et al. "Context Based Spelling correction." Information Processing & Management, vol. 27, No. 5, 1991, pp. 517-522.

*Primary Examiner*—Michael R. Fleming
*Assistant Examiner*—Michelle Doerrler
*Attorney, Agent, or Firm*—Marc D. Schechter

[57] ABSTRACT

A language generator for a speech recognition apparatus scores a word-series hypothesis by combining individual scores for each word in the hypothesis. The hypothesis score for a single word comprises a combination of the estimated conditional probability of occurrence of a first class of words comprising the word being scored, given the occurrence of a context comprising the words in the word-series hypothesis other than the word being scored, and the estimated conditional probability of occurrence of the word being scored given the occurrence of the first class of words, and given the occurrence of the context. An apparatus and method are provided for classifying multiple series of words for the purpose of obtaining useful hypothesis scores in the language generator and speech recognition apparatus.

35 Claims, 3 Drawing Sheets

SPEECH RECOGNITION APPARATUS WHICH PREDICTS WORD CLASSES FROM CONTEXT AND WORDS FROM WORD CLASSES

This invention was made with Government support under Contract Number N00014-91-C-0135 awarded by the Office of Naval Research. The Government has certain rights in this invention.

BACKGROUND OF THE INVENTION

The invention relates to speech recognizers, language translators, spelling checkers and other devices which generate and score word-series hypotheses. More particularly, the invention relates to a language generator having a language model for scoring word-series hypotheses in speech recognizers, language translators, spelling checkers and other devices.

Certain automatic speech recognition devices, automatic language translation devices, and automatic spelling correction devices have been known to operate according to the model $$Pr(W|Y) = \frac{Pr(W) \times Pr(Y|W)}{Pr(Y)} \qquad [1]$$

In this model, W is a word-series hypothesis representing a series of one or more words, for example English-language words. The term Pr(W) is the probability of occurrence of the word-series hypothesis. The variable Y is an observed signal, and Pr(Y) is the probability of occurrence of the observed signal. Pr(W/Y) is the probability of occurrence of the word-series W, given the occurrence of the observed signal Y. Pr(Y/W) is the probability of occurrence of the observed signal Y, given the occurrence of the word-series W.

For automatic speech recognition, Y is an acoustic signal. (See, for example, L. R. Bahl, et al. "A Maximum Likelihood Approach to Continuous Speech Recognition." *IEEE Transactions on Pattern Analysis and Machine Intelligence*, Volume PAMI-5, No. 2, March 1983, pages 179-190.) For automatic language translation, Y is a sequence of words in another language different from the language of the word-series hypothesis. (See, for example, P. F. Brown, et al. "A Statistical Approach To Machine Translation." *Computational Linguistics*, Vol. 16, No. 2, June 1990, pages 79-85.) For automatic spelling correction, Y is a sequence of characters produced by a possibly imperfect typist. (See, for example, E. Mays, et al. "Context Based Spelling Correction." *Information Processing & Management*, Vol. 27, No. 5, 1991, pages 517-522.)

In all three applications, given a signal Y, one seeks to determine the series of English words, W, which gave rise to the signal Y. In general, many different word series can give rise to the same signal Y. The model minimizes the probability of choosing an erroneous word series by selecting the word series W having the largest conditional probability given the observed signal Y.

As shown in Equation 1, the conditional probability of the word series W given the observed signal Y is the combination of three terms: (i) the probability of the word series W, multiplied by (ii) the probability that the observed signal Y will be produced when the word-series W is intended, divided by (iii) the probability of observing the signal Y.

In the case of automatic speech recognition, the probability of the acoustic signal Y given the hypothesized word series W is estimated by using an acoustic model of the word series W. In automatic language translation, the probability of the sequence of words Y in another language given the hypothesized English-translation word series W is estimated by using a translation model for the word series W. In automatic spelling correction, the probability of the sequence of characters Y produced by a possibly imperfect typist given the hypothesized word series W is estimated by using a mistyping model for the word series W.

In all three applications, the probability of the word series W can be modeled according to the equation:

$$Pr(w_1^k) = Pr(w_1)Pr(w_2|w_1) \ldots Pr(w_k|w_1^{k-1}), \qquad [2]$$

where $w_1^k$ represents a series of words $w_1, w_2, \ldots, w_k$.

In the conditional probability $Pr(w_k|w_1^{k-1})$, the terms $w_1^{k-1}$ is called the history or the predictor feature. Each word in the history is a predictor word. The term $w_k$ is called the predicted feature or the category feature.

The mechanism for estimating the conditional probabilities in Equation 2 is called a language model. A language model estimates the conditional probabilities from limited training text. The larger the training text, and the larger the number of parameters in the language model, the more accurate and precise are the predictions from the language model.

In all three applications, the probability Pr(Y) of occurrence of the observed signal Y can either be modeled as a function of some parameters, or can be assumed to be independent of the word series W to be found. In the latter case, the term Pr(Y) is dropped out of Equation 1.

SUMMARY OF THE INVENTION

It is an object of the invention to provide a language generating apparatus and method, such as for a speech recognition apparatus, having a highly accurate and precise language model with a relatively small number of parameters.

It is another object of the invention to provide a language generating apparatus and method having highly accurate language model estimates of the conditional probabilities of predicted words from relatively small amounts of training text.

It is a further object of the invention to provide an apparatus and method for classifying a set of observed events, such as a series of two or more words, for generating an accurate and precise language model.

According to the invention, a language generator comprises means for generating two or more word-series hypothesis signals. Each word-series hypothesis signal represents a word-series hypothesis comprising a series of linguistic units. Each linguistic unit comprises one or more words selected from a language.

The language generator further includes means for generating a signal-unit hypothesis score signal for each linguistic unit in each word-series hypothesis. Each single-unit hypothesis score signal represents a single-unit hypothesis score comprising an estimate of the probability of occurrence of the individual linguistic unit in the word-series hypothesis.

Means are provided for generating a word-series hypothesis score signal for each word-series hypothesis. Each word-series hypothesis score signal comprises a combination of the single-unit hypothesis scores for the linguistic units in the word-series hypothesis.

The language generator further includes means for storing one or more candidate word-series hypothesis signals representing candidate word-series hypothesis having the best word-series hypothesis scores. Output means are provided for outputting at least one word signal representing at least one word in at least one best candidate word-series hypothesis.

In the language generator according to the present invention, the means for generating a single-unit hypothesis score signal for a first individual linguistic unit comprises means for estimating the conditional probability of occurrence of a first class of linguistic units comprising the first individual linguistic unit, given the occurrence of a context comprising the linguistic units in the word-series hypothesis other than the first individual linguistic unit. Means are also provided for estimating the conditional probability of occurrence of the first individual linguistic unit given the occurrence of the first class of linguistic units, and given the occurrence of the context. The single-unit hypothesis score signal for the first individual linguistic unit comprises a first component score comprising a combination of the estimated conditional probability of occurrence of the first class of linguistic units given the occurrence of the context, and the estimated conditional probability of occurrence of the first individual linguistic unit given the occurrence of the first class and given the occurrence of the context.

In one aspect of the invention, the conditional probability of occurrence of the first individual linguistic unit given the occurrence of the first class of linguistic units, and given the occurrence of the context is estimated by the conditional probability of occurrence of the first individual linguistic unit given the occurrence of the first class of linguistic units.

The conditional probability of occurrence of the first class of linguistic units, given the occurrence of the context, may be estimated by the conditional probability of occurrence of the first class of linguistic units, given the occurrence of a first context set comprising one or more linguistic units in the word-series hypothesis other than the first individual linguistic unit. Alternatively, the conditional probability of occurrence of the first class of linguistic units given the occurrence of the context may be estimated as a weighted combination of (a) the conditional probability of occurrence of the first class of linguistic units, given the occurrence of a first context set comprising one or more linguistic units in the word-series hypothesis other than the first individual linguistic unit, and (b) the conditional probability of occurrence of the first class of linguistic units given the occurrence of a second context set, different from the first context set, comprising one or more linguistic units in the word-series hypothesis other than the first individual linguistic unit.

The means for generating a single-unit hypothesis score signal for the first individual linguistic unit may further comprise means for estimating the conditional probability of occurrence of a second class of linguistic units comprising the first linguistic unit, given the occurrence of the context comprising the linguistic units in the word-series hypothesis other than the first individual linguistic unit. Means are also provided for estimating the conditional probability of occurrence of the first individual linguistic unit given the occurrence of the second class of linguistic units, and given the occurrence of the context. A second component score is generated comprising a combination of the estimated conditional probability of occurrence of the second class of linguistic units given the occurrence of the context, and the estimated conditional probability of occurrence of the first individual linguistic unit given the occurrence of the second class of linguistic units and given the occurrence of the context. A single-unit hypothesis score for the first individual linguistic unit comprises a weighted combination of the first component score and the second component score.

The conditional probability of occurrence of the first individual linguistic unit given the occurrence of the second class of linguistic units, and given the occurrence of the context may be estimated by the conditional probability of occurrence of the first individual linguistic unit given the occurrence of the second class of linguistic units.

The conditional probability of occurrence of the second class of linguistic units, given the occurrence of the context, may be estimated by the conditional probability of occurrence of the second class of linguistic units, given the occurrence of a first context set comprising one or more linguistic units in the word-series hypothesis other than the first individual linguistic unit. Alternatively, the conditional probability of occurrence of the second class of linguistic units, given the occurrence of the context, may be estimated as a weighted combination of the preceding quantity and the conditional probability of occurrence of the second class of linguistic units, given the occurrence of a second context set, different from the first context set, comprising one or more linguistic units in the word-series hypothesis other than the first individual linguistic unit.

The means for generating two or more word-series hypothesis signals may comprise, for example, an acoustic processor for measuring the value of at least one feature of an utterance over each of a series of successive time intervals to produce a series of acoustic feature signals representing the feature values. Means are provided for generating an acoustic match score for each of a plurality of word-series hypotheses. Each acoustic match score comprises an estimate of the closeness of a match between an acoustic model of the word-series hypothesis and the series of acoustic feature signals. Finally, means generate two or more word-series hypothesis signals representing word-series hypothesis having the best acoustic match scores.

The acoustic processor may comprise a microphone.

The output means may comprise, for example, means for displaying at least one word in at least one best candidate word-series hypothesis. The display means may be, for example, a cathode ray tube or a liquid crystal display.

Alternatively, the output means may comprise means for generating the sound of at least one word in at least one best candidate word-series hypothesis. The sound generating means may comprise, for example, a speech synthesizer and/or a loudspeaker.

The means for storing candidate word-series hypotheses may comprise an electronic read/write memory.

The invention is also an apparatus and method for classifying a set of observed events. Each event has a predictor feature and a category feature. The predictor feature has one of two or more different values. The category feature has one of two or more different possible values. The apparatus comprises means for measuring the predictor feature value and the category feature value of each event in the set of events. Means are provided for selecting one or more different, noncomplementary sets of category feature values, and for selecting at least three different, noncomplementary sets of predictor feature values. Each set of category feature values contains less than all possible category feature values. Each set of predictor feature values contains less than all possible predictor feature values.

The classification apparatus further includes means for generating a primary prediction score for each set of predictor feature values and for each set of category feature values. Each primary prediction score comprises an estimate of how well the set of predictor feature values predicts the occurrence of one set of category feature values for all events in the set of observed events. An event is classified in a first class if the predictor feature value of the event is a member of the set of predictor feature values having the best primary prediction score.

Means are also provided for generating a secondary prediction score for each set of predictor feature values, other than the set of predictor feature values having the best primary prediction score, and for each set of category feature values. Each secondary prediction score comprises an estimate of how well the set of predictor feature values predicts the occurrence of one set of category feature values for all events in the first class of observed events. An event from the first class of events is classified in a first sub-class if the predictor feature value of the event is a member of the set of predictor feature values having the best secondary prediction score.

In the classification apparatus and method according to the invention, each primary prediction score comprises an estimate of how well the set of predictor feature values predicts the occurrence of a set of category feature values in the set of observed events, weighted by a primary weighting factor associated with the set of predictor feature values. Each secondary prediction score comprises an estimate of how well the set of predictor feature values predicts the occurrence of a set of category feature values in the first class of observed events, weighted by a secondary weighting factor associated with the set of predictor feature values. At least one set of predictor feature values, other than the set of predictor feature values having the best primary prediction score, has an associated primary weighting factor which is not equal to its associated secondary weighting factor.

In one aspect of the invention, each event comprises a series of two or more words.

The apparatus may further comprise means for classifying an event from the first class of events in a second sub-class if the predictor feature value of the event is not a member of the set of predictor feature values having the best secondary prediction score.

The invention is also a speech recognition apparatus comprising an acoustic processor for outputting a sequence of coded representations of an utterance to be recognized. Means are provided for generating an acoustic match score for each of a plurality of word-series hypotheses. Each acoustic match score comprises an estimate of the closeness of a match between an acoustic model of the word-series hypothesis and the sequence of coded representations of the utterance. Each word-series hypothesis comprises two or more words. Means are also provided for generating two or more candidate word-series hypothesis signals representing word-series hypotheses having the best acoustic match scores. A language generator according to the present invention receives the candidate word-series hypotheses and outputs at least one word signal representing at least one word in at least one best candidate word-series hypothesis.

In the language generator apparatus and method, and the speech recognition apparatus according to the present invention, by grouping words in a language model into classes, a highly accurate language model can be obtained with a relatively small number of parameters. By combining a number of different class-based language models, a highly accurate language model can be obtained from relatively small amounts of training text.

In an apparatus and method for classifying a set of observed events according to the present invention, by assigning different weighting factors to a set of predictor feature values for different levels of classification, the resulting classified word sequences can be used to generate an improved language model.

DESCRIPTION OF THE PREFERRED EMBODIMENTS

Figure 1:
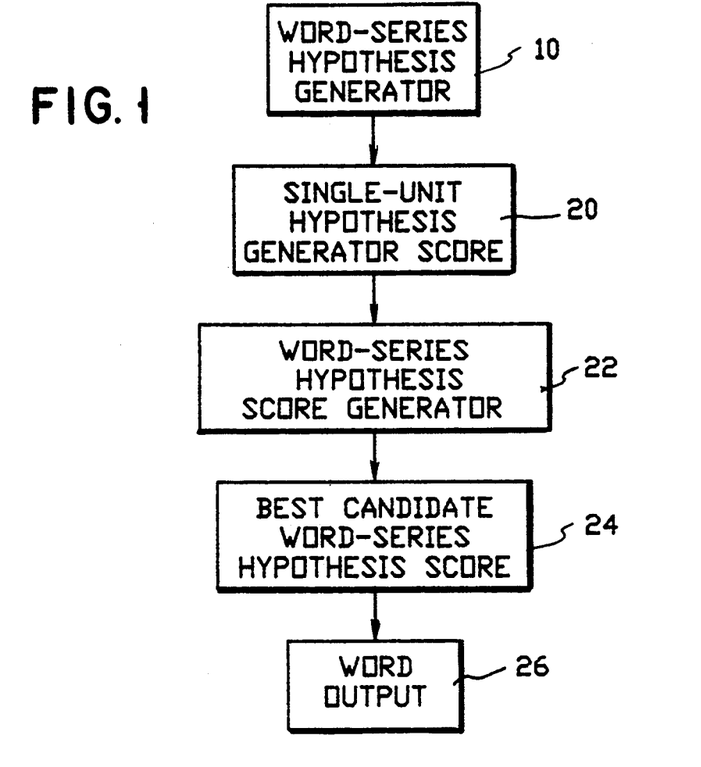
FIG. 1 is a block diagram of an example of a language generator according to the present invention.

FIG. 1 is a block diagram of an example of a language generator according to the present invention. The language generator comprises a word-series hypothesis generator 10 for generating two or more word-series hypothesis signals. Each word-series hypothesis signal represents a word-series hypothesis comprising a series of linguistic units. Each linguistic unit comprises one or more words selected from a language.

Figure 2:
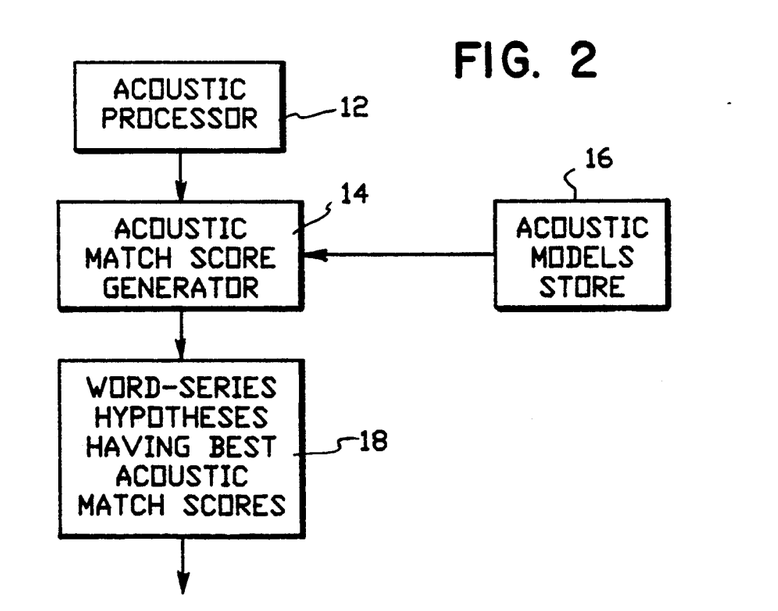
FIG. 2 is a block diagram of an example of a word-series hypothesis generator for a language generator according to the present invention.

One example of a word-series hypothesis generator 10 is shown in the block diagram of FIG. 2. In this example, the word-series hypothesis generator 10 comprises an acoustic processor 12 for measuring the value of at least one feature of an utterance over each of a series of successive time intervals to produce a series of acoustic feature signals representing the feature value. An acoustic match score generator 14 generates an acoustic match score for each of a plurality of word-series hypotheses. Each acoustic match score comprises an estimate of the closeness of a match between an acoustic model of the word-series hypothesis (stored in acoustic models store 16) and the series of acoustic feature signals from acoustic processor 12.

The acoustic models in store 16 may be, for example, Markov models. The parameters of the acoustic models may be estimated from a known uttered training text by, for example, the Forward-Backward Algorithm. Acoustic match scores may be obtained, for example, by maximum likelihood estimation. (See, for example, L. R. Bahl, et al, March 1983, cited above.)

Finally, the word-series hypothesis generator 10 includes means 18 for generating two or more word-series hypothesis signals representing word-series hypotheses having the best acoustic match scores.

Alternatively, the word-series hypothesis generator 10 may generate word-series hypotheses based upon automatic language translation scores or automatic spelling correction scores. (See, for example, P. F. Brown et al, June 1990, and E. Mays et al, 1991, cited above.)

Returning to FIG. 1, the language generator further comprises a single-unit hypothesis score generator 20 for generating a single-unit hypothesis score signal for each linguistic unit in each word-series hypothesis. Each single-unit hypothesis score signal represents a single-unit hypothesis score comprising an estimate of the probability of occurrence of the individual linguistic unit in the word-series hypothesis.

A word-series hypothesis score generator 22 generates a word-series hypothesis score signal for each word-series hypothesis. Each word-series hypothesis score signal comprises a combination of the single-unit hypothesis scores for the linguistic units in the word-series hypothesis.

The language generator further includes a best candidate word-series hypothesis store 24 for storing one or more candidate word-series hypothesis signals representing candidate word-series hypotheses having the best word-series hypothesis scores. A word output 26 outputs at least one word signal representing at least one word in at least one best candidate word-series hypothesis.

Figure 3:
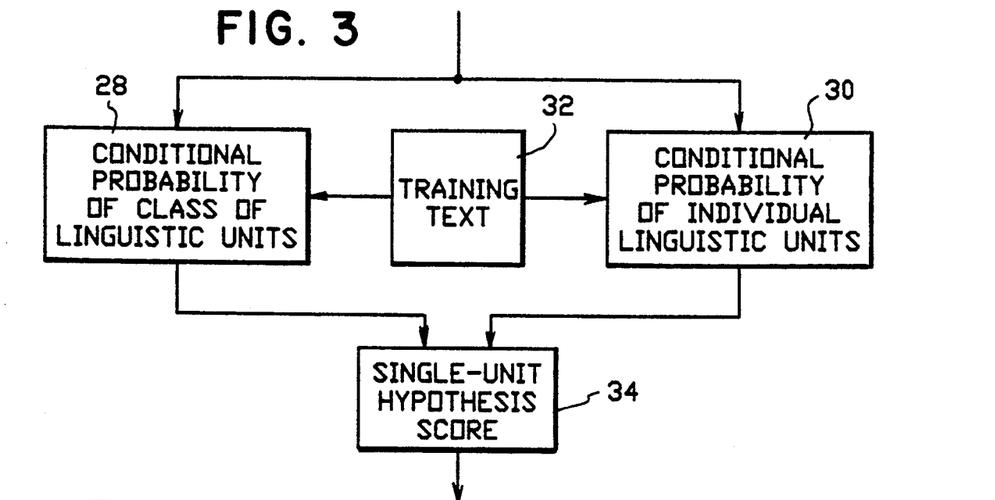
FIG. 3 is a block diagram of an example of a single-unit hypothesis score generator for a language generator according to the present invention.

FIG. 3 is a block diagram of an example of a single-unit hypothesis score generator 20. The single-unit hypothesis score generator 20 comprises means 28 for estimating the conditional probability of occurrence of a first class of linguistic units comprising the first individual linguistic unit, given the occurrence of a context comprising the linguistic units in the word-series hypothesis other than the first individual linguistic unit. Means 30 are provided for estimating the conditional probability of occurrence of the first individual linguistic unit given the occurrence of the first class of linguistic units, and given the occurrence of the context.

The conditional probability of occurrence of a first class of linguistic units given the occurrence of the context may be estimated from the training text 32 by counting the number of occurrences in the training text of words in the first class of linguistic units and having the selected context, and dividing that count by the number of occurrences in the training text 32 of any word having the selected context. The conditional probability of occurrence of the first individual linguistic unit given the occurrence of the first class of linguistic units, and given the occurrence of the context may be estimated from the training text 32 by counting the number of occurrences in the training text of the individual linguistic unit having the selected context, and dividing that count by the number of occurrences in the training text of any word in the first class having the selected context.

The single-unit hypothesis score generator 20 further comprises means 34 for generating a single-unit hypothesis score signal for the first individual linguistic unit comprising a first component score comprising a combination of the estimated conditional probability of occurrence of the first class of linguistic units given the occurrence of the context, and the estimated conditional probability of occurrence of the first individual linguistic unit given the occurrence of the first class and given the occurrence of the context.

Preferably, the conditional probability of occurrence of the first individual linguistic unit given the occurrence of the first class of linguistic units, and given the occurrence of the context may be estimated by the conditional probability of occurrence of the first individual linguistic unit given the occurrence of the first class of linguistic units. In this case, the conditional probability of occurrence of the first individual linguistic unit given the occurrence of the first class of linguistic units may be estimated from the training text by counting the number of occurrences in training text of the first individual linguistic unit, and dividing that count by the number of occurrences in the training text of all linguistic units in the first class of linguistic units.

The conditional probability of occurrence of the first class of linguistic units, given the occurrence of the context may be estimated by the conditional probability of occurrence of the first class of linguistic units, given the occurrence of a first context set comprising one or more linguistic units in the word-series hypothesis other than the first individual linguistic unit.

Alternatively, the conditional probability of occurrence of the first class of linguistic units, given the occurrence of the context may be estimated as a weighted combination of two or more components. One component may be, for example, the conditional probability of occurrence of the first class of linguistic units, given the occurrence of a first context set comprising one or more linguistic units in the word-series hypothesis other than the first individual linguistic unit. A second component may be the conditional probability of occurrence of the first class of linguistic units, given the occurrence of a second context set, different from the first context set, comprising one or more linguistic units in the word-series hypothesis other than the first individual linguistic unit. The weighting factors may be obtained, for example, by the method of deleted interpolation. (See, for example, L. R. Bahl, et al, March 1983, cited above.)

In another alternative single-unit hypothesis generator 20 shown in FIGS. 1 and 3, the means 28 may also estimate the conditional probability of occurrence of a second class of linguistic units comprising the first individual linguistic unit, given the occurrence of the context comprising the linguistic units in the word-series hypothesis other than the first individual linguistic unit. The means 30 may also estimate the conditional probability of occurrence of a first individual linguistic unit given the occurrence of the second class of linguistic units, and given the occurrence of the context. Both conditional probabilities may be estimated from the training text 32, as described above.

Means 34 then generate a second component score comprising a combination of the estimated conditional probability of occurrence of the second class of linguistic units given the occurrence of the context, and the estimated conditional probability of occurrence of the first individual linguistic given the occurrence of the second class of linguistic units and given the occurrence of the context. A single-unit hypothesis score for the first individual linguistic unit comprises a weighted combination of the first component score and the second component score. The weighting factors can be obtained, for example, by the method of deleted interpolation.

The conditional probability of occurrence of the first individual linguistic unit given the occurrence of the second class of linguistic units, and given the occurrence of the context may be estimated by the conditional probability of occurrence of the first individual linguistic unit given the occurrence of the second class of linguistic units. The conditional probability of occurrence of the first individual linguistic unit given the occurrence of the second class of linguistic units may be estimated from the training text 32 by counting the number of occurrences in the training text of the first individual linguistic unit, and by dividing that count by the number of occurrences in the training text of linguistic units in the second class of linguistic units.

The conditional probability of occurrence of the second class of linguistic units, given the occurrence of the context may be estimated as the conditional probability of occurrence of the second class of linguistic units, given the occurrence of a first context set comprising one or more linguistic units in the word-series hypothesis other than the first individual linguistic unit. Alternatively, the conditional probability of the second class of linguistic units, given the occurrence of the context may be estimated as a weighted combination of two or more terms such as (a) the conditional probability of occurrence of the second class of linguistic units given the occurrence of a first context set comprising one or more linguistic units in the word-series hypothesis other than the first individual linguistic unit, and (b) the conditional probability of occurrence of the second class of linguistic units given the occurrence of a second context set, different from the first context set, comprising one or more linguistic units in the word-series hypothesis other than a first individual linguistic unit. The weighted coefficients may be obtained, for example, by the method of deleted interpolation.

The operation of the language generator apparatus and method according to the present invention may be illustrated by the following hypothetical example.

Table 1 is a hypothetical example of seven classes A through F of linguistic units, where each linguistic unit is a single word.

TABLE 1

| CLASS | WORDS |
|---|---|
| A | fast, speedy, hungry, hunting, angry, deadly |
| B | train, house, car, book, computer, ski |
| C | on, of, in, as, near, for |
| D | my, his, a, the, what, some |
| E | lion, hawk, shark, wolf, tiger, bear |
| F | air, forest, sky, mountain, park, tree |

In this hypothetical example, each class contains six words. No word is found in more than one class.

For the classes A through F, Table 2 shows hypothetical values of the conditional probability of occurrence of the class $W(i)$ of the i-th word in a word series, given the occurrence of a context comprising the class of the prior word $W(i-1)$ in the word series. As discussed above, the conditional probabilities may be obtained by counting occurrences of words in a training text.

TABLE 2

| Class of $W(i)$ | Prob [Class of $W(i)$ \| Class of $W(i-1)$] | | | | | |
|---|---|---|---|---|---|---|
| $W(i-1)$ | A | B | C | D | E | F |
| A | 0.047 | 0.0208 | 0.025 | 0.0236 | 0.0869 | 0.0028 |
| B | 0.013 | 0.0005 | 0.026 | 0.0466 | 0.0147 | 0.0262 |
| C | 0.0588 | 0.0291 | 0.0043 | 0.0291 | 0.0269 | 0.0673 |
| D | 0.0224 | 0.0208 | 0.0499 | 0.0006 | 0.0159 | 0.0022 |
| E | 0.0093 | 0.0356 | 0.024 | 0.0651 | 0.0004 | 0.034 |
| F | 0.0084 | 0.0448 | 0.0448 | 0.0474 | 0.0397 | 0.0003 |

Table 3 shows hypothetical values for the conditional probability of occurrence of the class of the word $W(i)$ in the series of words, given the occurrence of a context comprising the class of the second prior word $W(i-2)$ in the word-series hypothesis. The conditional probabilities may be obtained by counting occurrences of words in a training text.

TABLE 3

| Class of $W(i)$ | Prob [Class of $W(i)$ \| Class of $W(i-2)$] | | | | | |
|---|---|---|---|---|---|---|
| $W(i-2)$ | A | B | C | D | E | F |
| A | 0.0016 | 0.0049 | 0.047 | 0.0038 | 0.0113 | 0.0513 |
| B | 0.0518 | 0.0432 | 0.0011 | 0.0313 | 0.0135 | 0.007 |
| C | 0.034 | 0.041 | 0.0318 | 0.0291 | 0.0405 | 0.0329 |
| D | 0.021 | 0.324 | 0.0443 | 0.0076 | 0.0421 | 0.0518 |
| E | 0.0086 | 0.0232 | 0.0405 | 0.0383 | 0.0005 | 0.041 |
| F | 0.0194 | 0.0157 | 0.0318 | 0.0281 | 0.0291 | 0.0475 |

For each class A through F, Table 4 shows hypothetical values for the conditional probability of occurrence of the word $W(i)$ in the word-series hypothesis given the occurrence of the class $C[W(i)]$ containing the word $W(i)$.

TABLE 4

| Prob [$W(i)$ \| Class of $W(i)$] | | | | | | |
|---|---|---|---|---|---|---|
| $W(i)$ | fast | speedy | hungry | hunting | angry | deadly |
| $P\{W(i)|C[W(i)]\}$ | 0.224 | 0.198 | 0.407 | 0.041 | 0.033 | 0.097 |
| $W(i)$ | train | house | car | book | computer | ski |
| $P\{W(i)|C[W(i)]\}$ | 0.336 | 0.179 | 0.294 | 0.01 | 0.006 | 0.175 |
| $W(i)$ | on | of | in | as | near | for |
| $P\{W(i)|C[W(i)]\}$ | 0.134 | 0.142 | 0.167 | 0.064 | 0.297 | 0.196 |
| $W(i)$ | my | his | a | the | what | some |
| $P\{W(i)|C[W(i)]\}$ | 0.177 | 0.159 | 0.083 | 0.198 | 0.181 | 0.201 |
| $W(i)$ | lion | hawk | shark | wolf | tiger | bear |
| $P\{W(i)|C[W(i)]\}$ | 0.184 | 0.212 | 0.241 | 0.071 | 0.027 | 0.265 |
| $W(i)$ | air | forest | sky | mountain | park | tree |
| $P\{W(i)|C[W(i)]\}$ | 0.249 | 0.123 | 0.145 | 0.055 | 0.257 | 0.17 |

Table 5 shows the single-unit hypothesis scores for the words $W_i$ in four different word-series hypotheses. The single-unit hypothesis scores were obtained using the conditional probability values of Tables 2, 3, and 4. In the hypothetical example, the conditional probabilities of the class of $W(i)$ given the class of the prior word and given the class of the second prior word are weighted by 0.75 and 0.25, respectively.

TABLE 5

| $W_{i-2}$ | $W_{i-1}$ | $W_i$ | $P(C(W_i)\|C(W_{i-1}))$ | $P(C(W_i)\|C(W_{i-2}))$ | $P(W_i\|C(W_i))$ | Single Unit Hypothesis Score Component | Component | Weighted Combination |
|---|---|---|---|---|---|---|---|---|
| the | angry | shark | 0.0869 | 0.0421 | 0.241 | 0.0209 | 0.0101 | 0.0182 |
| the | angry | park | 0.0028 | 0.0518 | 0.257 | 0.0007 | 0.0133 | 0.0039 |
| near | the | ski | 0.0208 | 0.041 | 0.175 | 0.0036 | 0.0072 | 0.0045 |
| near | the | sky | 0.0022 | 0.0329 | 0.145 | 0.0003 | 0.0048 | 0.0014 |
|  |  |  |  |  | Weight = | 0.75 | 0.25 |  |

In a similar manner, the single-unit hypothesis scores may be obtained for each other word in each hypothesis. Thereafter, the word-series hypothesis score for each hypothesis is obtained by combining the single-unit hypothesis scores for all words in the hypothesis. When the single-unit scores represent estimated probabilities, the scores may be combined by multiplication. When the single-unit scores represent estimated logarithms of probabilities, the scores may be combined by addition.

Returning to the hypothetical examples of Table 5, as between the word series, "the angry shark" and "the angry park", the single-unit hypothesis scores of the first two words will be the same for both hypotheses. Therefore, the word-series hypothesis score for "the angry shark" will be better (in this case higher is better) than the word-series hypothesis score for "the angry park". Consequently, as between the word series, "the angry shark" and "the angry park", "the angry shark" will be displayed.

Similarly, as between the word series, "near the ski" and "near the sky," the single-unit hypothesis scores of the first two words will be the same for both hypotheses. Therefore, the word-series hypothesis score for "near the ski" will be better (in this case higher is better) than the word-series hypothesis score for "near the sky". Consequently, as between the word series, "near the ski" and "near the sky", "near the ski" will be displayed.

The classes of linguistic units, and the context sets comprising one or more linguistic units for the language generator method and apparatus according to the present invention can be obtained by an apparatus and method for classifying a set of observed events. In the set of observed events, each event has a predictor feature and a category feature. The predictor feature has one of two or more different possible values. The category feature has one of two or more different possible values.

In a language model for a language generator, each event may comprise, for example, a series of two or more words $w_1, w_2, w_3, \ldots, w_n$. In each series of words, the word being predicted is the category feature, and the remaining words are predicted features. For example, in a series of three words, the first and second words may be the predictor feature, and the third word which is being predicted may be the category feature. Thus, the sentence "Speech recognition is formulated as a problem of maximum likelihood decoding," contains the three-word events shown in Table 6.

TABLE 6

TEXT:
"Speech recognition is formulated as a problem of maximum likelihood decoding."

| THREE-WORD EVENTS | PREDICTOR FEATURE | CATEGORY FEATURE |
|---|---|---|
| 1 | Speech recognition | is |
| 2 | recognition is | formulated |
| 3 | is formulated | as |
| 4 | formulated as | a |
| 5 | as a | problem |
| 6 | a problem | of |
| 7 | problem of | maximum |
| 8 | of maximum | likelihood |
| 9 | maximum likelihood | decoding |

Figure 4:
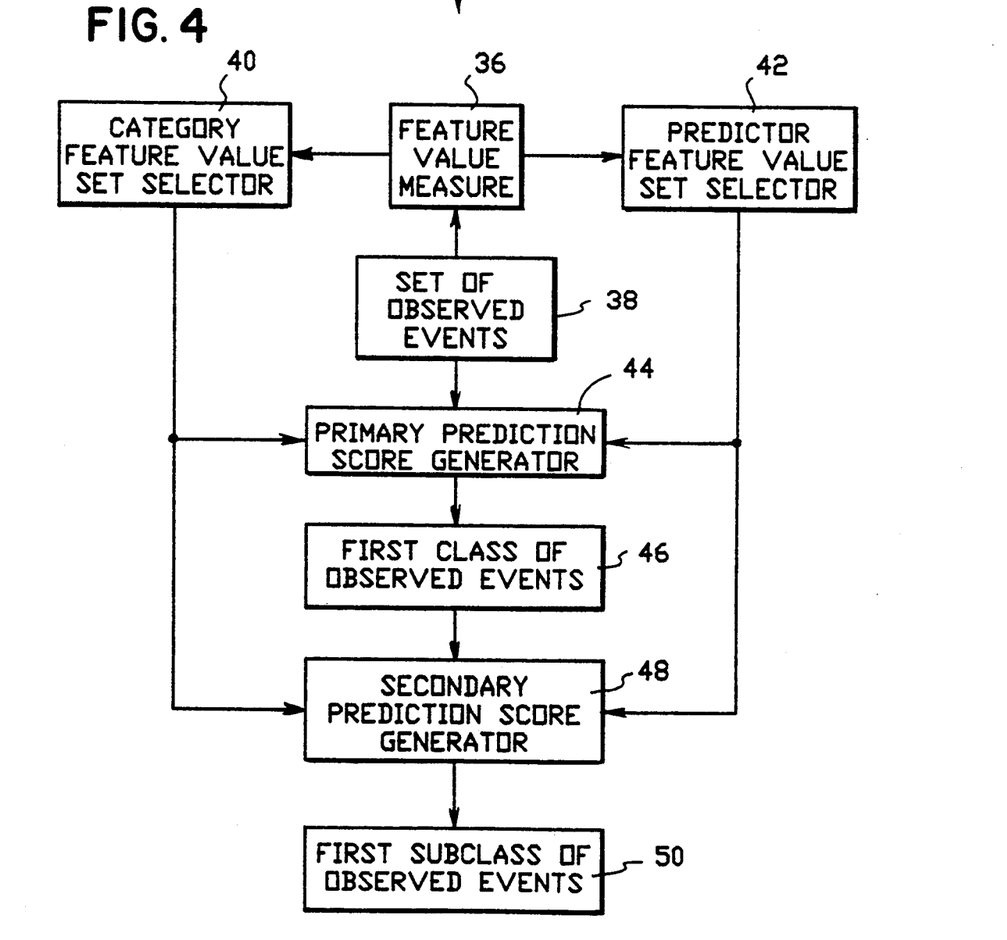
FIG. 4 is a block diagram of an example of an apparatus for classifying a set of observed events according to the present invention.

FIG. 4 shows a block diagram of an example of an apparatus for classifying a set of observed events according to the present invention. The apparatus includes a feature value measure 36 for measuring the predictor feature value and the category feature value of each event in the set of events. If a training text is stored in machine readable form on magnetic or other media 38, the feature value measure 36 may comprise suitable hardware and software for reading the data on the media.

The apparatus for classifying observed events further includes a category feature value set selector 40 for selecting one or more different, noncomplementary sets of category feature values. Each set of category feature values contains less than all possible category feature values. If each event comprises a series of n words $w_1, w_2, w_3, \ldots, w_n$, the category feature value of an event may be, for example, the identity of the last word $w_n$ in the series. Each set of category feature values then contains a subset of the entire vocabulary of words in the training text.

A predictor feature value set selector 40 selects at least three different noncomplementary sets of predictor feature values. Each set of predictor feature values contains less than all possible predictor feature values. If each event comprises a series of n words $w_1, w_2, w_3, \ldots, w_n$, the predictor feature value of an event may be, for example, the identities of the first $(n-1)$ words $w_1, \ldots, w_{n-1}$ in the series. Each set of predictor feature values may, for example, contain all word-series $w_1, \ldots, w_{n-1}$ where a word $w_p (1 \leq p \leq n-1)$ in the series is a member of a subset of the entire vocabulary of words in the training text.

Preferably, the vocabulary subsets which determine the sets of category feature values for the word $w_n$ and the sets of predictor feature values for the word $w_p$ are obtained by partitioning a vocabulary of V words into two mutually exclusive subsets $c_1$ and $c_2$ such that the average mutual information of subsets of adjacent words $\{w_{i-1}$ and $w_i\}$ in the training text is high. The average mutual information I is given by $$I(c_m^1, c_n^2) = \sum_m \sum_n P(c_m^1, c_n^2) \log \frac{P(c_m^1, c_n^2)}{P(c_m^1) P(c_n^2)} \quad [3]$$

where $P(C_m^1, C_n^2)$ is the probability that in a series of two adjacent words $\{w_1, w_2\}$, the first word is in class $c_m$ and the second word is in class $c_n$ The following algorithm may be used to partition a vocabulary of V words into two subsets such that the average mutual information of subsets of adjacent words is high. Initially, each word of the vocabulary V is assigned to a distinct subset, and the average mutual information between subsets of adjacent words is obtained from Equation 3. For every possible pair of subsets, that one pair of subsets is merged, and the average mutual information between subsets of adjacent words is calculated. The pair of subsets for which the loss in average mutual information is least is then merged, so only (V−1) subsets remain.

From the (V−1) subsets, each word of the vocabulary is moved to the subset which results in a partition having the greatest mutual information. When there is no reassignment of a word which leads to a partition with greater average mutual information, the (V−1) subsets are complete. While it may be possible to find a partition with higher average mutual information by simultaneously reassigning two or more words, such a search is regarded as too costly to be feasible.

Thereafter, the process is repeated to merge the (V−1) subsets into (V−2) subsets, and so on, until only two subsets remain.

In the merging algorithm described above, the order in which the clusters are merged defines a binary tree. The root of the binary tree is the entire vocabulary of words. The leaves of the binary tree are the individual words in the vocabulary. Individual nodes of the binary tree define additional vocabulary subsets which may be used to determine sets of category feature values and sets of predictor feature values.

Returning to FIG. 4, a primary prediction score generator 44 generates a primary prediction score for each set of predictor feature values from set selector 42 and for each set of category feature values from set selector 40. Each primary prediction score comprises an estimate of how well the set of predictor values predicts the occurrence of one set of category feature values for all events in the set of observed events 38. Means 46 classify an event in a first class if the predictor feature value of the event is a member of the set of predictor feature values having the best primary prediction score.

A secondary prediction score generator 48 generates a secondary prediction score for each set of predictor feature values other than the set of predictor feature values having the best primary prediction score, and for each set of category feature values. Each secondary prediction score comprises an estimate of how well the set of predictor feature values predicts the occurrence of one set of category feature values for all events in the first class of observed events 46. An event from a first class of events is classified in a first subclass 50 if the predictor feature value is a member of the set of predictor feature values having the best secondary prediction score.

Each primary prediction score comprises an estimate of how well the set of predictor feature values predicts the occurrence of a set of category feature values in the set of observed events, weighted by a primary weighting factor associated with the set of predictor feature values. Each secondary prediction score comprises an estimate of how well the set of predictor feature values predicts the occurrence of a set of category feature values in the first class of observed events, weighted by a secondary weighting factor associated with the set of predicted feature values.

At least one set of predictor feature values, other than the set of predictor feature values having the best primary prediction score, has an associated primary weighting factor which is not equal to its associated secondary weighting factor.

The apparatus and method for classifying a set of observed events may further comprise means for classifying an event from the first class of events in a second subclass if the predictor feature value of the event is not a member of the set of predicted feature values having the best secondary prediction score.

The prediction score for a set B of predictor feature values and for a set Y of category feature values may be, for example, the conditional entropy $H(Y|B)$ of a binary split of the events according to the set of category feature values given a binary split of events according to the set of predictor feature values.

$$\begin{aligned} H(Y|B) = & -P(Y, B)\log P(Y|B) \\ & -P(\overline{Y}, B)\log P(\overline{Y}|B) \\ & -P(Y, \overline{B})\log P(Y|\overline{B}) \\ & -P(\overline{Y}, \overline{B})\log P(\overline{Y}|\overline{B}) \end{aligned} \quad [4]$$

In Equation 4, $\overline{Y}$ is the complement of the set Y, and $\overline{B}$ is the complement of the set B. The best prediction score is the one representing the lowest conditional entropy.

An alternative prediction score may be the cross-entropy $$\begin{aligned} H_x(Y|B) = & -P(Y, B)\log M(Y|B) \\ & -P(\overline{Y}, B)\log M(\overline{Y}|B) \\ & -P(Y, \overline{B})\log M(Y|\overline{B}) \\ & -P(\overline{Y}, \overline{B})\log M(\overline{Y}|\overline{B}) \end{aligned} \quad [5]$$

In equation 5, P represents a probability distribution estimated from test data, and M represents a probability distribution obtained from training data. In one example, all of the available data may be divided into one training set and one test set. The P and M probability distributions are then determined from the events in the test set and the training set, respectively.

Alternatively, the entire set of data may be partitioned into L segments so that each event is associated with one of the L segments. A cross-entropy is calculated for each segment using that segment as test data, and using all of the remaining data belonging to all of the other segments as training data. The cross-entropies for the segments are then summed to obtain the total cross-entropy.

In another alterative, the prediction score for a set B of predictor feature values and a set Y of category feature values may look ahead to the next classification level by estimating the conditional entropy $H(Y|B, B'_n)$ of the set Y given the set B, and given another set B′ of predictor feature values $$H(Y|B, B_n') = -P(Y, B, B_n')\log P(Y|B, B_n')$$
$$-P(Y, B, \overline{B}_n')\log P(Y|B, \overline{B}_n')$$
$$-P(Y, \overline{B}, B_n')\log P(Y|\overline{B}, B_n')$$
$$-P(\overline{Y}, B, B_n')\log P(\overline{Y}|B, B_n')$$
$$-P(Y, \overline{B}, \overline{B}_n')\log P(Y|\overline{B}, \overline{B}_n')$$
$$-P(\overline{Y}, B, \overline{B}_n')\log P(\overline{Y}|B, \overline{B}_n')$$
$$-P(\overline{Y}, B, \overline{B}_n')\log P(\overline{Y}|B, \overline{B}_n')$$
$$-P(\overline{Y}, \overline{B}, \overline{B}_n')\log P(\overline{Y}|\overline{B}, \overline{B}_n') \quad [6]$$

The prediction score for the set Y of category feature values and the set B of predictor feature values is the best (in this case the smallest) value of $H(Y|B, B'_n)$ from Equation 6, for all sets $B'_n$ of predictor feature values.

The language generator apparatus and method, the apparatus and method for classifying a set of observed events, and the speech recognition apparatus according to the present invention are preferably in the form of a suitably programmed digital computer system. In such a system, the word cutput 26 may be a display such as a cathode ray tube or a liquid crystal display. Alternatively, the word output 26 may be a sound generator, such as a speech synthesizer with a loudspeaker. The means for storing candidate word-series hypothesis and other storage means may comprise an electronic read-/write memory.

Figure 5:
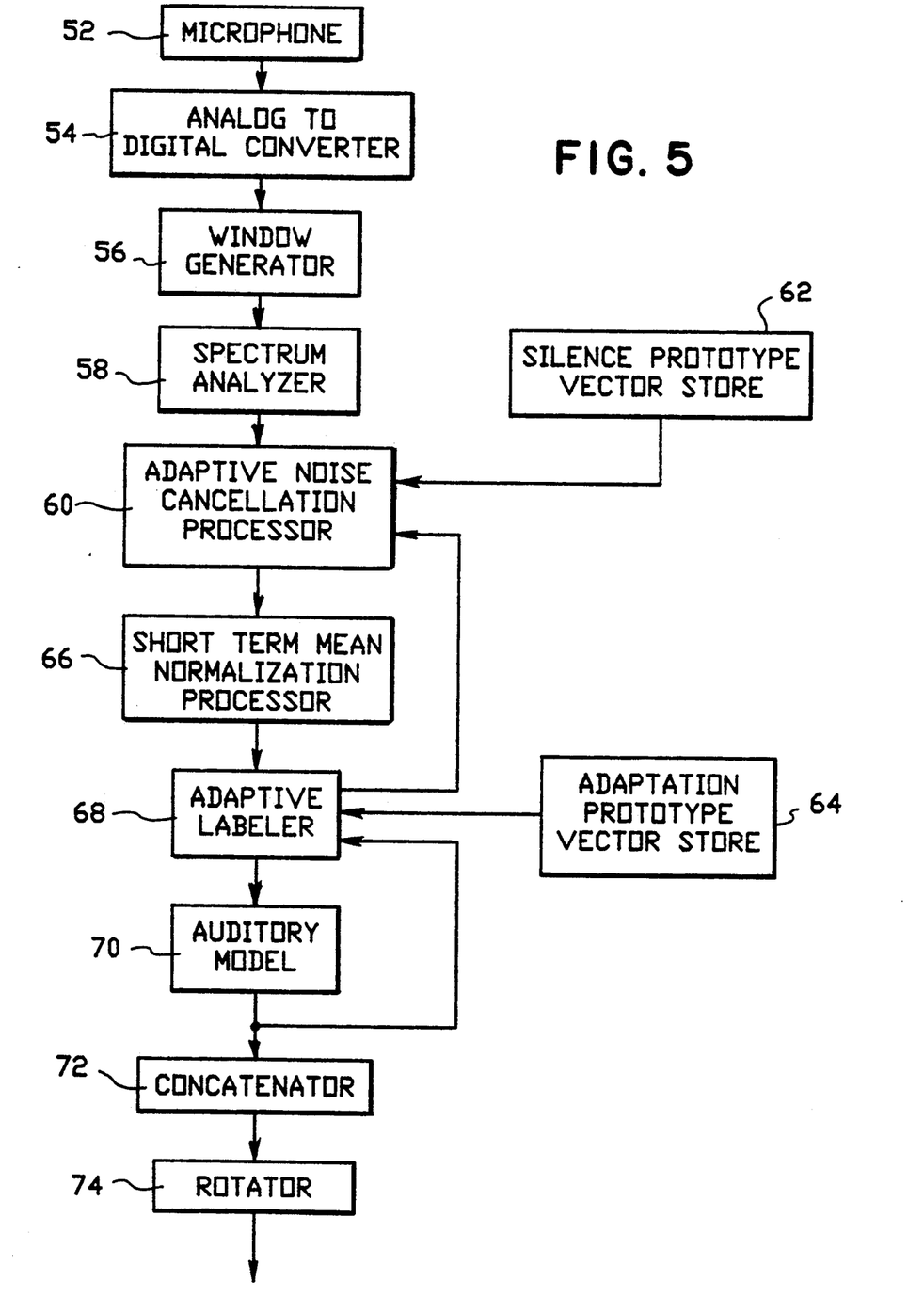
FIG. 5 is a block diagram of an example of an acoustic processor for a word-series hypothesis generator.

One example of an acoustic processor 12 (FIG. 2) is shown in FIG. 5. The measuring means includes a microphone 52 for generating an analog electrical signal corresponding to the utterance. The analog electrical signal from microphone 52 is converted to a digital electrical signal by analog to digital converter 54. For this purpose, the analog signal may be sampled, for example, at a rate of twenty kilohertz by the analog to digital converter 54.

A window generator 56 obtains, for example, a twenty millisecond duration sample of the digital signal from analog to digital converter 54 every ten milliseconds (one centisecond). Each twenty millisecond sample of the digital signal is analyzed by spectrum analyzer 58 in order to obtain the amplitude of the digital signal sample in each of, for example, twenty frequency bands. Preferably, spectrum analyzer 58 also generates a twenty-first dimension signal representing the total amplitude or total power of the twenty millisecond digital signal sample. The spectrum analyzer 58 may be, for example, a fast Fourier transform processor. Alternatively, it may be a band of twenty band pass filters.

The twenty-one dimension vector signals produced by spectrum analyzer 58 may be adapted to remove background noise by an adaptive noise cancellation processor 60. Noise cancellation processor 60 subtracts a noise vector N(t) from the feature vector F(t) input into the noise cancellation processor to produce an output feature vector F'(t). The noise cancellation processor 60 adapts to changing noise levels by periodically updating the noise vector N(t) whenever the prior feature vector F(t−1) is identified as noise or silence. The noise vector N(t) is updated according to the formula $$N(t) = \frac{N(t-1) + k[F(t-1) - Fp(t-1)]}{(1+k)}, \quad [7]$$

where N(t) is the noise vector at time t, N(t−1) is the noise vector at time (t−1), k is a fixed parameter of the adaptive noise cancellation model, F(t−1) is the feature vector input into the noise cancellation processor 60 at time (t−1) and which represents noise or silence, and Fp(t−1) is one silence or noise prototype vector, from store 62, closest to feature vector F(t−1).

The prior feature vector F(t−1) is recognized as noise or silence if either (a) the total energy of the vector is below a threshold, or (b) the closest prototype vector in adaptation prototype vector store 64 to the feature vector is a prototype representing noise or silence. For the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector F'(t) is normalized to adjust for variations in the loudness of the input speech by short term mean normalization processor 66. Normalization processor 66 normalizes the twenty-one dimension feature vector F'(t) to produce a twenty dimension normalized feature vector X(t). The twenty-first dimension of the feature vector F'(t), representing the total amplitude or total power, is discarded. Each component i of the normalized feature vector X(t) at time t may, for example, be given by the equation $$X_i(t) = F'_i(t) - Z(t) \quad [8]$$

in the logarithmic domain, where $F'_i(t)$ is the i-th component of the nonnormalized vector at time t, and where Z(t) is a weighted mean of the components of F'(t) and Z(t−1) according to Equations 9 and 10:

$$Z(t) = 0.9Z(t-1) + 0.1M(t) \quad [9]$$

and where $$M(t) = \frac{1}{20} \sum_i F_i'(t) \quad [10]$$

The normalized twenty dimension feature vector X(t) may be further processed by an adaptive labeler 68 to adapt to variations in pronunciation of speech sounds. An adapted twenty dimension feature vector X'(t) is generated by subtracting a twenty dimension adaptation vector A(t) from the twenty dimension feature vector X(t) provided to the input of the adaptive labeler 68. The adaptation vector A(t) at time t may, for example, be given by the formula $$A(t) = \frac{A(t-1) + k[X(t-1) - Xp(t-1)]}{(1+k)}, \quad [11]$$

where k is a fixed parameter of the adaptive labeling model, X(t−1) is the normalized twenty dimension vector input to the adaptive labeler 68 at time (t−1), Xp(t−1) is the adaptation prototype vector (from adaptation prototype store 64) closest to the twenty dimension feature vector X(t−1) at time (t−1), and A(t−1) is the adaptation vector at time (t−1).

The twenty dimension adapted feature vector signal X'(t) from the adaptive labeler 68 is preferably provided to an auditory model 70. Auditory model 70 may, for example, provide a model of how the human auditory system perceives sound signals. An example of an auditory model is described in U.S. Pat. No. 4,980,918 to L.

R. Bahl et al entitled "Speech Recognition System with Efficient Storage and Rapid Assembly of Phonological Graphs".

Preferably, according to the present invention, for each frequency band i of the adapted feature vector signal X'(t) at time t, the auditory model 70 calculates a new parameter $E_i(t)$ according to Equations 12 and 13:

$$E_i(t) = K_1 + K_2(X'_i(t))(N_i(t-1)) \quad [12]$$

where $$N_i(t) = K_3 \times N_i(t-1) - E_i(t-1) \quad [14]$$

and where $K_1$, $K$, and $K_3$ are fixed parameters of the auditory model.

For each centisecond time interval, the output of the auditory model 70 is a modified twenty dimension feature vector signal. This feature vector is augmented by a twenty-first dimension having a value equal to the square root of the sum of the squares of the values of the other twenty dimensions.

For each centisecond time interval, a concatenator 72 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 74 by a rotation matrix to rotate the spliced vector and to reduce the spliced vector to fifty dimensions.

The rotation matrix used in rotator 74 may be obtained, for example, by classifying into M classes a set of 189 dimension spliced vectors obtained during a training session. The covariance matrix for all of the spliced vectors in the training set is multiplied by the inverse of the within-class covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, *IBM Technical Disclosure Bulletin*, Volume 34, No. 7, December 1989, pages 340 and 341.)

Window generator 56, spectrum analyzer 58, adaptive noise cancellation processor 60, short term mean normalization processor 66, adaptive labeler 68, auditory model 70, cancatenator 72, and rotator 74, may be suitably programmed special purpose or general purpose digital signal processors. Prototype stores 62 and 64 may be electronic computer memory.

We claim:

1. A language generator comprising:

means for generating two or more word-series hypothesis signals, each word-series hypothesis signal representing a word-series hypothesis comprising a series of linguistic units, each linguistic unit comprising one or more words selected from a language;

means for generating a single-unit hypothesis score signal for each linguistic unit in each word-series hypothesis, each single-unit hypothesis score signal representing a single-unit hypothesis score comprising an estimate of the probability of occurrence of the individual linguistic unit in the word-series hypothesis;

means for generating a word-series hypothesis score signal for each word-series hypothesis, each word-series hypothesis score signal comprising a combination of the single-unit hypothesis scores for the linguistic units in the word-series hypothesis;

means for storing one or more word-series hypothesis signals representing candidate word-series hypotheses having the best word-series hypothesis scores; and means for outputting at least one word signal representing at least one word in at least one best candidate word-series hypothesis;

characterized in that the means for generating a single-unit hypothesis score signal for a first individual linguistic unit comprises:

means for estimating the conditional probability of occurrence of a first class of linguistic units comprising the first individual linguistic unit, given the occurrence of a context comprising the linguistic units in the word-series hypothesis other than the first individual linguistic unit;

means for estimating the conditional probability of occurrence of the first individual linguistic unit given the occurrence of the first class of linguistic units, and given the occurrence of the context; and means for generating a single-unit hypothesis score signal for the first individual linguistic unit comprising a first component score comprising a combination of the estimated conditional probability of occurrence of the first class of linguistic units given the occurrence of the context, and the estimated conditional probability of occurrence of the first individual linguistic unit given the occurrence of the first class and given the occurrence of the context.

2. A language generator as claimed in claim 1, characterized in that the conditional probability of occurrence of the first individual linguistic unit given the occurrence of the first class of linguistic units, and given the occurrence of the context is estimated by the conditional probability of occurrence of the first individual linguistic unit given the occurrence of the first class of linguistic units.

3. A language generator as claimed in claim 1, characterized in that the conditional probability of occurrence of the first class of linguistic units, given the occurrence of the context is estimated by the conditional probability of occurrence of the first class of linguistic units, given the occurrence of a first context set comprising one or more linguistic units in the word-series hypothesis other than the first individual linguistic unit.

4. A language generator as claimed in claim 1, characterized in that the conditional probability of occurrence of the first class of linguistic units, given the occurrence of the context is estimated as a weighted combination of:

the conditional probability of occurrence of the first class of linguistic units, given the occurrence of a first context set comprising one or more linguistic units in the word-series hypothesis other than the first individual linguistic unit; and the conditional probability of occurrence of the first class of linguistic units, given the occurrence of a second context set, different from the first context set, comprising one or more linguistic units in the word-series hypothesis other than the first individual linguistic unit.

5. A language generator as claimed in claim 1, characterized in that the means for generating a single-unit hypothesis score signal for the first individual linguistic unit further comprises:

means for estimating the conditional probability of occurrence of a second class of linguistic units comprising the first individual linguistic unit, given the occurrence of the context comprising the linguistic units in the word-series hypothesis other than the first individual linguistic unit;

means for estimating the conditional probability of occurrence of the first individual linguistic unit given the occurrence of the second class of linguistic units, and given the occurrence of the context;

means for generating a second component score comprising a combination of the estimated conditional probability of occurrence of the second class of linguistic units given the occurrence of the context, and the estimated conditional probability of occurrence of the first individual linguistic unit given the occurrence of the second class of linguistic units and given the occurrence of the context; and     means for generating a single-unit hypothesis score for the first individual linguistic unit comprising a weighted combination of the first component score and the second component score.

6. A language generator as claimed in claim 5, characterized in that the conditional probability of occurrence of the first individual linguistic unit given the occurrence of the second class of linguistic units, and given the occurrence of the context is estimated by the conditional probability of occurrence of the first individual linguistic unit given the occurrence of the second class of linguistic units.

7. A language generator as claimed in claim 5, characterized in that the conditional probability of occurrence of the second class of linguistic units, given the occurrence of the context is estimated by the conditional probability of occurrence of the second class of linguistic units, given the occurrence of a first context set comprising one or more linguistic units in the word-series hypothesis other than the first individual linguistic unit.

8. A language generator as claimed in claim 5, characterized in that the conditional probability of occurrence of the second class of linguistic units, given the occurrence of the context is estimated as a weighted combination of:

the conditional probability of occurrence of the second class of linguistic units, given the occurrence of a first context set comprising one or more linguistic units in the word-series hypothesis other than the first individual linguistic unit; and     the conditional probability of occurrence of the second class of linguistic units, given the occurrence of a second context set, different from the first context set, comprising one or more linguistic units in the word-series hypothesis other than the first individual linguistic unit.

9. A language generator as claimed in claim 1, characterized in that the means for generating two or more word-series hypothesis signals comprises:

an acoustic processor for measuring the value of at least one feature of an utterance over each of a series of successive time intervals to produce a series of acoustic feature signals representing the feature values;

means for generating an acoustic match score for each of a plurality of word-series hypotheses, each acoustic match score comprising an estimate of the closeness of a match between an acoustic model of the word-series hypothesis and the series of acoustic feature signals; and     means for generating two or more word-series hypothesis signals representing word-series hypotheses having the best acoustic match scores.

10. A language generator as claimed in claim 9, characterized in that the acoustic processor comprises a microphone.

11. A language generator as claimed in claim 1, characterized in that the output means comprises means for displaying at least one word in at least one best candidate word-series hypothesis.

12. A language generator as claimed in claim 11, characterized in that the display means comprises a cathode ray tube.

13. A language generator as claimed in claim 11, characterized in that the display means comprises a liquid crystal display.

14. A language generator as claimed in claim 1, characterized in that the output means comprises means for generating the sound of at least one word in at least one best candidate word-series hypothesis.

15. A language generator as claimed in claim 14, characterized in that the sound generating means comprises a speech synthesizer.

16. A language generator as claimed in claim 14, characterized in that the sound generating means comprises a loudspeaker.

17. A language generator as claimed in claim 1, characterized in that the means for storing candidate word-series hypotheses comprises an electronic read/write memory.

18. A method as claimed in claim 1, characterized in that the step of outputting comprises generating the sound of at least one word in at least one best candidate word-series hypothesis.

19. A method of generating language, said method comprising the steps of:

generating two or more word-series hypothesis signals, each word-series hypothesis signal representing a word-series hypothesis comprising a series of linguistic units, each linguistic unit comprising one or more words selected from a language;

generating a single-unit hypothesis score signal for each linguistic unit in each word-series hypothesis, each single-unit hypothesis score signal representing a single-unit hypothesis score comprising an estimate of the probability of occurrence of the individual linguistic unit in the word-series hypothesis;

generating a word-series hypothesis score signal for each word-series hypothesis, each word-series hypothesis score signal comprising a combination of the single-unit hypothesis scores for the linguistic units in the word-series hypothesis;

storing one or more candidate word-series hypothesis signals representing word-series hypotheses having the best word-series hypothesis scores; and     outputting at least one word signal representing at least one word in at least one best candidate word-series hypothesis;

characterized in that the step of generating a single-unit hypothesis score signal for a first individual linguistic unit comprises:

estimating the conditional probability of occurrence of a first class of linguistic units comprising the first individual linguistic unit, given the occurrence of a context comprising the linguistic units in the word-series hypothesis other than the first individual linguistic unit;

estimating the conditional probability of occurrence of the first individual linguistic unit given the occurrence of the first class of linguistic units, and given the occurrence of the context; and generating a single-unit hypothesis score signal for the first individual linguistic unit comprising a first component score comprising a combination of the estimated conditional probability of occurrence of the first class of linguistic units given the occurrence of the context, and the estimated conditional probability of occurrence of the first individual linguistic unit given the occurrence of the first class and given the occurrence of the context.

20. A method as claimed in claim 19, characterized in that the conditional probability of occurrence of the first individual linguistic unit given the occurrence of the first class of linguistic units, and given the occurrence of the context is estimated by the conditional probability of occurrence of the first individual linguistic unit given the occurrence of the first class of linguistic units.

21. A method as claimed in claim 19 characterized in that the conditional probability of occurrence of the first class of linguistic units, given the occurrence of the context is estimated by the conditional probability of occurrence of the first class of linguistic units, given the occurrence of a first context set comprising one or more linguistic units in the word-series hypothesis other than the first individual linguistic unit.

22. A method as claimed in claim 19, characterized in that the conditional probability of occurrence of the first class of linguistic units, given the occurrence of the context is estimated as a weighted combination of:

the conditional probability of occurrence of the first class of linguistic units, given the occurrence of a first context set comprising one or more linguistic units in the word-series hypothesis other than the first individual linguistic unit; and the conditional probability of occurrence of the first class of linguistic units, given the occurrence of a second context set, different from the first context set, comprising one or more linguistic units in the word-series hypothesis other than the first individual linguistic unit.

23. A method as claimed in claim 19, characterized in that the step of generating a single-unit hypothesis score signal for the first individual linguistic unit further comprises:

estimating the conditional probability of occurrence of a second class of linguistic units comprising the first individual linguistic unit, given the occurrence of the context comprising the linguistic units in the word-series hypothesis other than the first individual linguistic unit;

estimating the conditional probability of occurrence of the first individual linguistic unit given the occurrence of the second class of linguistic units, and given the occurrence of the context;

generating a second component score comprising a combination of the estimated conditional probability of occurrence of the second class of linguistic units given the occurrence of the context, and the estimated conditional probability of occurrence of the first individual linguistic unit given the occurrence of the second class of linguistic units and given the occurrence of the context; and generating a single-unit hypothesis score for the first individual linguistic unit comprising a weighted combination of the first component score and the second component score.

24. A method as claimed in claim 23, characterized in that the conditional probability of occurrence of the first individual linguistic unit given the occurrence of the second class of linguistic units, and given the occurrence of the context is estimated by the conditional probability of occurrence of the first individual linguistic unit given the occurrence of the second class of linguistic units.

25. A method as claimed in claim 23, characterized in that the conditional probability of occurrence of the second class of linguistic units, given the occurrence of the context is estimated by the conditional probability of occurrence of the second class of linguistic units, given the occurrence of a first context set comprising one or more linguistic units in the word-series hypothesis other than the first individual linguistic unit.

26. A method as claimed in claim 23, characterized in that the conditional probability of occurrence of the second class of linguistic units, given the occurrence of the context is estimated as a weighted combination of:

the conditional probability of occurrence of the second class of linguistic units, given the occurrence of a first context set comprising one or more linguistic units in the word-series hypothesis other than the first individual linguistic unit; and the conditional probability of occurrence of the second class of linguistic units, given the occurrence of a second context set, different from the first context set, comprising one or more linguistic units in the word-series hypothesis other than the first individual linguistic unit.

27. A method as claimed in claim 19, characterized in that the step of generating two or more word-series hypothesis signals comprises:

measuring the value of at least one feature of an utterance over each of a series of successive time intervals to produce a series of acoustic feature signals representing the feature values;

generating an acoustic match score for each of a plurality of word-series hypotheses, each acoustic match score comprising an estimate of the closeness of a match between an acoustic model of the word-series hypothesis and the series of acoustic feature signals; and generating two or more word-series hypothesis signals representing word-series hypotheses having the best acoustic match scores.

28. A method as claimed in claim 19, characterized in that the step of outputting comprises displaying at least one word in at least one best candidate word-series hypothesis.

29. An apparatus for classifying a set of observed events, each event having a predictor feature and a category feature, said predictor feature having one of two or more different possible values, said category feature having one of two or more different possible values, said apparatus comprising:

means for measuring the predictor feature value and the category feature value of each event in the set of events;

means for selecting one or more different, noncomplementary sets of category feature values, each set containing less than all possible category feature values;

means for selecting at least three different, noncomplementary sets of predictor feature values, each set of predictor feature values containing less than all possible predictor feature values;

means for generating a primary prediction score for each set of predictor feature values and for each set of category feature values, each primary prediction score comprising an estimate of how well the set of predictor feature values predicts the occurrence of one set of category feature values for all events in the set of observed events;

means for classifying an event in a first class if the predictor feature value of the event is a member of the set of predictor feature values having the best primary prediction score;

means for generating a secondary prediction score for each set of predictor feature values, other than the set of predictor feature values having the best primary prediction score, and for each set of category feature values, each secondary prediction score comprising an estimate of how well the set of predictor feature values predicts the occurrence of one set of category feature values for all events in the first class of observed events; and means for classifying an event from the first class of events in a first subclass if the predictor feature value of the event is a member of the set of predictor feature values having the best secondary prediction score;

characterized in that:

each primary prediction score comprises an estimate of how well the set of predictor feature values predicts the occurrence of a set of category feature values in the set of observed events, weighted by a primary weighting factor associated with the set of predictor feature values;

each secondary prediction score comprises an estimate of how well the set of predictor feature values predicts the occurrence of a set of category feature values in the first class of observed events, weighted by a secondary weighting factor associated with the set of predictor feature values; and at least one set of predictor feature values, other than the set of predictor feature values having the best primary prediction score, has an associated primary weighting factor which is not equal to a secondary weighting factor associated with the set.

30. An apparatus as claimed in claim 29, characterized in that each event comprises a series of two or more words.

31. An apparatus as claimed in claim 29, further comprising means for classifying an event from the first class of events in a second subclass if the predictor feature value of the event is not a member of the set of predictor feature values having the best secondary prediction score.

32. A method of classifying a set of observed events, each event having a predictor feature and a category feature, said predictor feature having one of two or more different possible values, said category feature having one of two or more different possible values, said method comprising the steps of:

measuring the predictor feature value and the category feature value of each event in the set of events;

selecting one or more different, noncomplementary sets of category feature values, each set containing less than all possible category feature values;

selecting at least three different, noncomplementary sets of predictor feature values, each set of predictor feature values containing less than all possible predictor feature values;

generating a primary prediction score for each set of predictor feature values and for each set of category feature values, each primary prediction score comprising an estimate of how well the set of predictor feature values predicts the occurrence of one set of category feature values for all events in the set of observed events;

classifying an event in a first class if the predictor feature value of the event is a member of the set of predictor feature values having the best primary prediction score;

generating a secondary prediction score for each set of predictor feature values, other than the set of predictor feature values having the best primary prediction score, and for each set of category feature values, each secondary prediction score comprising an estimate of how well the set of predictor feature values predicts the occurrence of one set of category feature values for all events in the first class of observed events; and classifying an event from the first class of events in a first subclass if the predictor feature value of the event is a member of the set of predictor feature values having the best secondary prediction score;

characterized in that:

each primary prediction score comprising an estimate of how well the set of predictor feature values predicts the occurrence of a set of category feature values in the set of observed events, weighted by a primary weighting factor associated with the set of predictor feature values;

each secondary prediction score comprises an estimate of how well the set of predictor feature values predicts the occurrence of a set of category feature values in the first class of observed events, weighted by a secondary weighting factor associated with the set of predictor feature values; and at least one set of predictor feature values, other than the set of predictor feature values having the best primary prediction score, has an associated primary weighting factor which is not equal to a secondary weighting factor associated with the set.

33. A method as claimed in claim 32, characterized in that each event comprises a series of two or more words.

34. A method as claimed in claim 32, further comprising the step of classifying an event from the first class of events in a second subclass if the predictor feature value of the event is not a member of the set of predictor feature values having the best secondary prediction score.

35. A speech recognition apparatus comprising:

an acoustic processor for outputting a sequence of coded representations of an utterance to be recognized;

means for generating an acoustic match score for each of a plurality of word-series hypotheses, each acoustic match score comprising an estimate of the closeness of a match between a model of the word-series hypothesis and the sequence of coded representations of the utterance, each word-series hypothesis comprising two or more words;

means for generating two or more candidate word-series hypothesis signals representing word-series hypotheses having the best acoustic match scores;

means for generating a single-word context score for each word in each candidate word-series hypothesis, each single-word context score comprising an estimate of the conditional probability of occurrence of a first individual word given the occurrence of a context set comprising one or more words in the word-series hypothesis other than the first individual word;

means for generating a word-series context score for each word-series hypothesis, each word-series context score comprising a combination of the single-word context scores for each word in the word-series hypothesis;

means for storing one or more best candidate word-series hypothesis signals representing word-series hypotheses having the best combined acoustic match and context scores; and means for outputting at least one word in at least one best candidate word-series hypothesis;

characterized in that the context set is generated by the steps of:

providing a set of sequences of two or more words, each word sequence having at least one predictor word and a category word;

selecting one or more different, noncomplementary sets of category words, each set of category words containing less than all possible category words;

selecting at least three different, noncomplementary sets of predictor words, each set of predictor words containing one or more words in the word-series hypothesis other than the first individual word, each set of predictor words containing less than all possible predictor words;

generating a primary prediction score for each set of predictor words and for each set of category words, each primary prediction score comprising an estimate of how well the set of predictor words predicts the occurrence of one set of category words for all word sequences in the set of words sequences;

classifying a word sequence in a first class if the predictor word of the word sequence is a member of the set of predictor words having the best primary prediction score;

generating a secondary prediction score for each set of predictor words, other than the set of predictor words having the best primary prediction score, and for each set of category words, each secondary prediction score comprising an estimate of how well the set of predictor words predicts the occurrence of one set of category words for all word sequences in the first class of word sequences; and classifying a word sequence from the first class of word sequences in a first subclass if the predictor word of the word sequence is a member of the set of predictor words having the best secondary prediction score;

and further characterized in that:

each primary prediction score comprises an estimate of how well the set of predictor words predicts the occurrence of a set of category words in the set of word sequences, weighted by a primary weighting factor associated with the set of predictor words;

each secondary prediction score comprises an estimate of how well the set of predictor words predicts the occurrence of a set of category words in the first class of word sequences, weighted by a secondary weighting factor associated with the set of predictor words; and at least one set of predictor words, other than the set of predictor words having the best primary prediction score, has an associated primary weighting factor which is not equal to a secondary weighting factor associated with the set.

* * * * *